United States Patent [19]

Sumino et al.

[11] Patent Number: 5,682,490

[45] Date of Patent: Oct. 28, 1997

[54] USER ADAPTIVE PARAMETRIC MACRO CREATION SYSTEM AND METHOD

[75] Inventors: Shigeo Sumino, Chofu; Takafumi Miyatake, Hachioji; Hirotada Ueda, Kokubunji, all of Japan

[73] Assignee: New Media Development Association, Tokyo, Japan

[21] Appl. No.: 251,301

[22] Filed: May 31, 1994

Related U.S. Application Data

[63] Continuation-in-part of Ser. No. 91,004, Jul. 13, 1993, abandoned.

[30] Foreign Application Priority Data

Jul. 15, 1992 [JP] Japan ................................. 4-187897
May 31, 1993 [JP] Japan ................................. 5-129141

[51] Int. Cl.$^6$ ......................................... G06F 15/00
[52] U.S. Cl. ................................. 395/352; 395/354
[58] Field of Search ................................. 395/700, 701, 395/704, 615, 613, 938, 333, 334, 335, 336, 352, 353, 354, 358

[56] References Cited

U.S. PATENT DOCUMENTS

| | | | |
|---|---|---|---|
| 5,191,643 | 3/1993 | Alsenz | 395/155 |
| 5,404,442 | 4/1995 | Foster et al. | 395/159 |
| 5,428,731 | 6/1995 | Powers, III | 395/154 |

FOREIGN PATENT DOCUMENTS 0401975  12/1990  European Pat. Off. .......... G06F 9/44

OTHER PUBLICATIONS

Yoshiaki Mima, "A Visual Programming Environment for Programming by Example Abstraction", IEEE Visual Languages, 1991, 132–137.

Brad Meyers, "Invisible Programming", IEEE Visual Languages, 1990, pp. 203–208.

Allen Cypher, "Eager: Programming Repetitive Tasks by Example", ACM, 1991, pp. 33–39.

Singh et al., "Creating Graphical Interfaces through Graphical Interaction", IEEE Visual Languages, 1990, pp. 187–193.

Sholl et al., "Using HyperCard To Rapidly Protype Human–Computer Interfaces To Case Systems", IEEE, 1989, pp. 1266–1267.

Baldassari et al., "Protob: an Object–oriented Case Tool for Modeling and Prototyping Distributed Systems", Software–Practice and Experience, vol. 21(8), 1991, pp. 823–844.

"Soundblaster 16 User Reference Manual", Creative Labs. Inc., 1992, Milpitas, CA, USA, pp. 10-3 to 10-6.

*Primary Examiner*—Dennis M. Butler
*Attorney, Agent, or Firm*—Antonelli, Terry, Stout & Kraus, LLP.

[57] ABSTRACT

A user adaptive system in a computer system executing an application program. The user adaptive system includes a storage area for storing therein a data structure corresponding to a combination of values for parameters to be arbitrarily set by a user for a job to be executed in the application program, a storage area for updating the combination of values in the structure, each time a parameter setting operation is conducted by the user, and a storage area operative, when a particular combination of values for the parameters is used more than a predetermined number of times, for registering the particular combination of values for the parameters.

10 Claims, 8 Drawing Sheets

USER ADAPTIVE PARAMETRIC MACRO CREATION SYSTEM AND METHOD

CROSS-REFERENCE TO RELATED APPLICATION

The present application is a Continuation-In-Part of U.S. patent application Ser. No. 08/091004 filed Jul. 13, 1993 now abandoned. The disclosure of that application is incorporated herein by reference.

BACKGROUND OF THE INVENTION

The present invention relates to a user adaptive system in which usability of the user's operation is improved according to functions of application programs operating in a computer, and in particular, to an adaptive method in which there is extracted a combination of setting values of parameters frequently used in a function by an individual user so as to register a combination of setting values matching the user's preference.

Heretofore, as a method of improving usability of user's operation in accordance with functions of application programs operating in a computer, there has been known a method of re-arranging candidate character strings in a kana (Japanese syllabary)/kanji (Chinese character) conversion of a word processor. For example, in a kanji term input apparatus described in the JP-B-57-32366, the re-arrangement is accomplished according to a utilization frequency; whereas, in a Japanese sentence input apparatus described in the JP-B-58-39334, the re-arrangement is carried out with precedence assigned to a last used term, namely, a kanji or an idiom previously used.

However, these methods of re-arranging candidate character strings have been devised in consideration only of a setting item, namely, a character string currently being converted. Namely, in these methods, there has not been considered a case where there exist many values to be set and these values exert influences upon each other. In such a case where the values are mutually influenced from each other, when a setting operation is conducted, other setting conditions are resultantly varied.

To set the values which exert influences upon each other to desired values, each setting value is to be slightly altered in a step-by-step manner while checking the overall setting state, namely, there is required a very detailed and time consuming operation.

In this situation, according to the graphics user interface employed in personal computers, there is used a method in which the previously set values are memorized. Consequently, it becomes unnecessary to conduct the tedious operation to set the values again.

According to the method in which the previously set values are memorized, when a setting operation is achieved in a similar fashion to that of the preceding operation, the human power will be saved. However, when these operations are different from each other, the detailed and time consuming operation is required to be carried out again.

In a case where particularly many setting values are to be set, the user does not always understand the cause-and-effect relationship between all the values, even if he understood a part of their relationship. This situation further necessitates additional human power.

In a case where a combination of predetermined setting values is frequently employed according to functions of application programs operating in a computer, when the combination of setting values can be registered to a button or the like, the user is relieved from tedious operations only by pushing the button, which considerably reduces the load imposed on the user.

SUMMARY OF THE INVENTION

It is therefore an object of the present invention to provide a user adaptive system and a method of adapting the same in which when there exist many values to be set according to functions of application programs operating in a computer, a combination of setting values frequently used by a user is extracted so as to register a combination of setting values matching the user's preference, thereby improving usability.

To achieve the object above, the user adaptive system and the method of adapting the same according to the present invention have the following aspects.

There are disposed a user adaptive system for use in a computer system executing an application program. The system includes means for storing a data structure corresponding to a combination of setting values specified by a user in a function of the application program, means for updating, each time a setting is conducted by the user, a data structure related thereto, and means for registering, in a case where a value of the data structure exceeds a threshold value, a pertinent combination of setting values.

In addition, when storing a data structure corresponding to a combination of setting values specified by a user in a function of the application program, in relation to values to be set by selecting from a group of selective items which are like radio buttons worked exclusively, items selected exclusively are treated as a set, thereby assigning a dimension of a matrix to each set of the items.

Furthermore, when storing the data structure corresponding to the combination of setting values, in relation to setting values like variable parameters to be successively modified by operating a slide bar with a mouse, a range of setting enabled values is subdivided according to an appropriate interval, each subdivided range is assigned with selective items, the items corresponding to the setting enabled values are regarded as a set, and a dimension of a matrix is assigned to each set of the items.

In addition, when storing the data structure corresponding to the combination of setting values, in relation to values set by typed in numerical key, setting enabled values are subdivided according to an appropriate interval, each subdivided range is assigned with selective items, the items corresponding to the setting enabled values are regarded as a set, and a dimension of a matrix is assigned to each set of the items.

Furthermore, when updating the matrix corresponding to the set of setting values, there is updated only a value of a position associated with the combination of setting values.

Moreover, when updating the matrix corresponding to the set of setting values, there are updated some values related to a setting.

In addition, a combination of the setting values frequently used are registered to a new button generated.

According to the present invention, in each function of application programs operating in a computer, there is memorized a data structure corresponding to a combination of setting values specified by a user. Each time the user sets a value, the related data structure is updated. When a value of the data structure exceeds a threshold value, the pertinent combination of setting values is registered to the system. Thanks to this operation above, a combination of setting values frequently utilized in a function by the user can be automatically registered.

Furthermore, when memorizing a data structure corresponding to a combination of setting values, in association with values to be selected for setting thereof from a group of selective items which are like radio buttons worked exclusively, the items selected exclusively are treated as a set so as to assign a dimension of a matrix to each set of items. Consequently, a group of setting values are handled in an independent manner.

In addition, when memorizing a data structure corresponding to a combination of setting values, in relation to setting values like variable parameters to be successively modified by operating a slide bar with a mouse, a range of setting enabled values is subdivided according to an appropriate interval. Each subdivided range is assigned with selective items and the items corresponding to the setting enabled values are regarded as a set to assign a dimension of a matrix to each set of the items. This consequently enables the continuous setting values to be mapped onto discrete items.

Furthermore, when memorizing the data structure corresponding to the combination of setting values, in relation to values set by typed in numerical key, setting enabled values are subdivided according to an appropriate interval, each subdivided range is assigned with selective items, the items corresponding to the setting enabled values are regarded as a set, and a dimension of a matrix is assigned to each set of the items. As a result, the continuous setting values can be mapped onto discrete setting items.

Moreover, when updating the matrix corresponding to the set of setting values, only a value of a position associated with the combination of setting values is updated, thereby extracting a combination of setting values frequently used by the user.

In addition, when updating the matrix corresponding to the set of setting values, some values related to a setting are updated so as to extract a combination of setting values frequently utilized by the user.

Furthermore, thanks to registration of a combination of the setting values frequently used to a new button generated, the user need only push the button to set all of the values matching the user's preference.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the accompanying drawings, description will be given in detail of embodiments according to the present invention.

Figure 1:
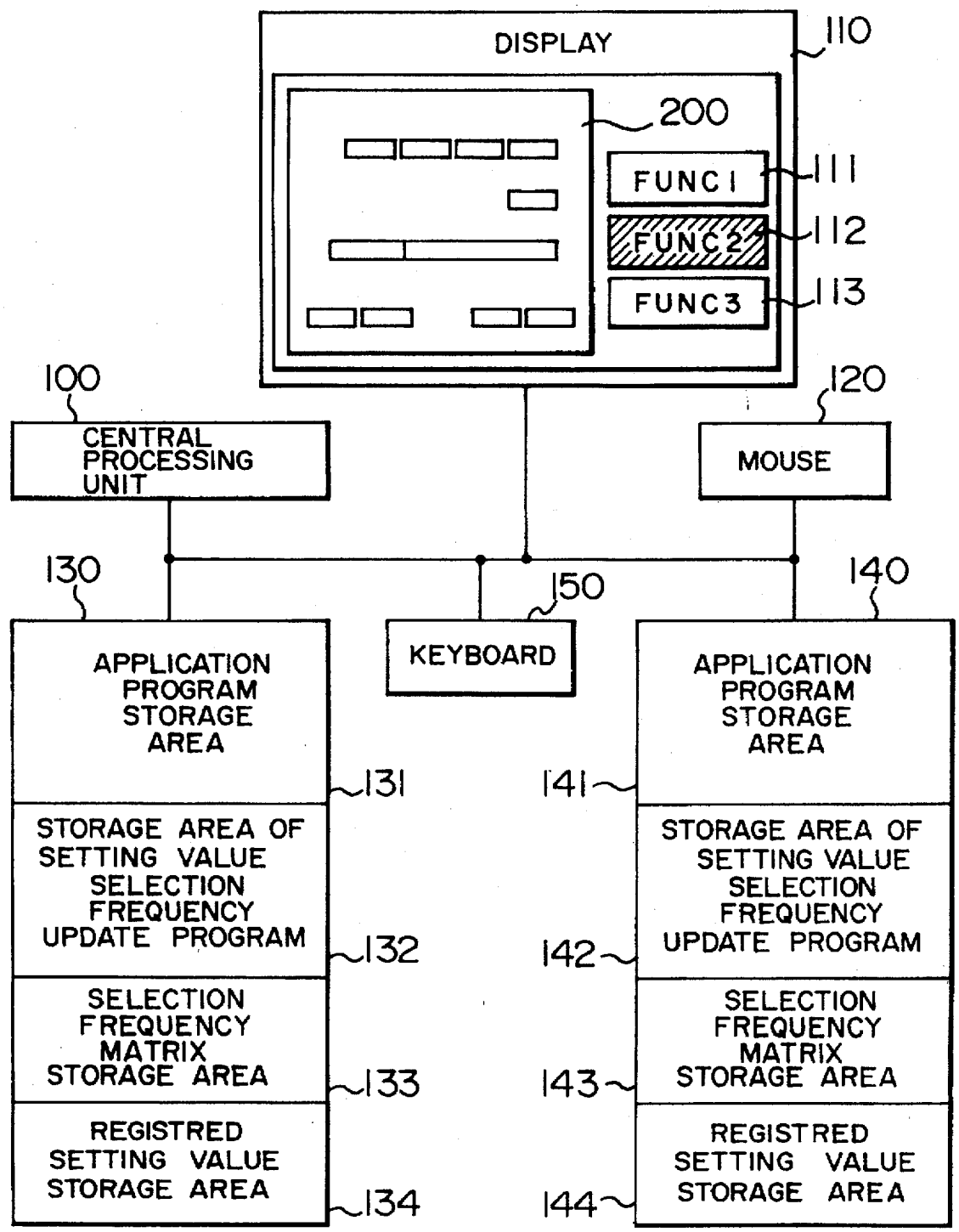
FIG. 1 is a block diagram showing the configuration of a user adaptive system in an embodiment according to the present invention.

FIG. 1 is a block configuration diagram showing an embodiment of a user adaptive system in accordance with the present invention. In FIG. 1, a numeral 100 indicates a central processing unit, a numeral 110 denotes a display for presenting thereon selective items 111 to 113 and setting windows to be opened when functions associated therewith are activated, a numeral 120 indicates a mouse as a pointing device to operate selective items of functions and setting windows presented on the display 110, a numeral 130 stands for a main storage, a numeral 140 designates an auxiliary storage for storing therein processing programs and data related to the present invention, and a numeral 150 indicates a keyboard to operate selective items of functions and setting windows presented on the display 110.

The main storage 130 includes an application program storage area 131 for storing therein an application program having a function to open a setting window 200, a setting value selection frequency update program storage area 132 related to the present invention for storing therein a setting value selection frequency update program to extract and to register a combination of setting values to be frequently used, a selection frequency matrix storage area 133 related to the present invention to store therein a selection frequency matrix (reference is to be made to a reference number 300 of FIG. 3) to be updated according to a combination of setting values, and a registered setting value storage area 134 related to the present invention to register therein a combination of setting values to be frequently used.

The auxiliary storage 140 includes an application program storage area 141 for storing therein an application program having a function to open a setting window 200, a setting value selection frequency update program storage area 142 related to the present invention for storing therein a setting value selection frequency update program to extract and to register a combination of setting values to be frequently used, a selection frequency matrix storage area 143 related to the present invention to store therein a selection frequency matrix (reference is to be made to a reference number 300 of FIG. 3) to be updated according to a combination of setting values, and a registered setting value storage area 144 related to the present invention to register therein a combination of setting values to be frequently used.

In the constitution above, according to the user adaptive system and the user adaptive method of the embodiment, in a case where existing application programs are utilized, user's operations are conducted by the central processing unit 110 as follows. Namely, a selection is conducted for the function selective items 111 to 113 presented on the display 110 such that the selected function is opened in the setting window 200 so as to set parameters by use of the mouse 120 and from the keyboard 150.

That is, the central processing unit 100 conducts an analysis according to the setting value selection frequency program loaded from the storage area 142 of the auxiliary storage 140 into the storage area 132 of the main storage 130 and then updates according to the user's setting the selection frequency matrix 300 stored in the storage area 133.

In a case where an element of the matrix 300 exceeds a predetermined threshold value, the combination of setting values is stored as a combination of setting values to be frequently used in the storage area 134 and is registered to a new setting button (240 and 250 of FIG. 2) generated in the setting window.

When the new setting button (240 and 250 of FIG. 2) is depressed, the pertinent setting operation is accomplished according to the stored combination of setting values.

With this provision, a combination of setting values to be frequently used in a function by the user can be automatically registered, namely, operations setting in a step-by-step manner can be achieved by pushing one button, thereby mitigating the load imposed on the user.

Figure 2:
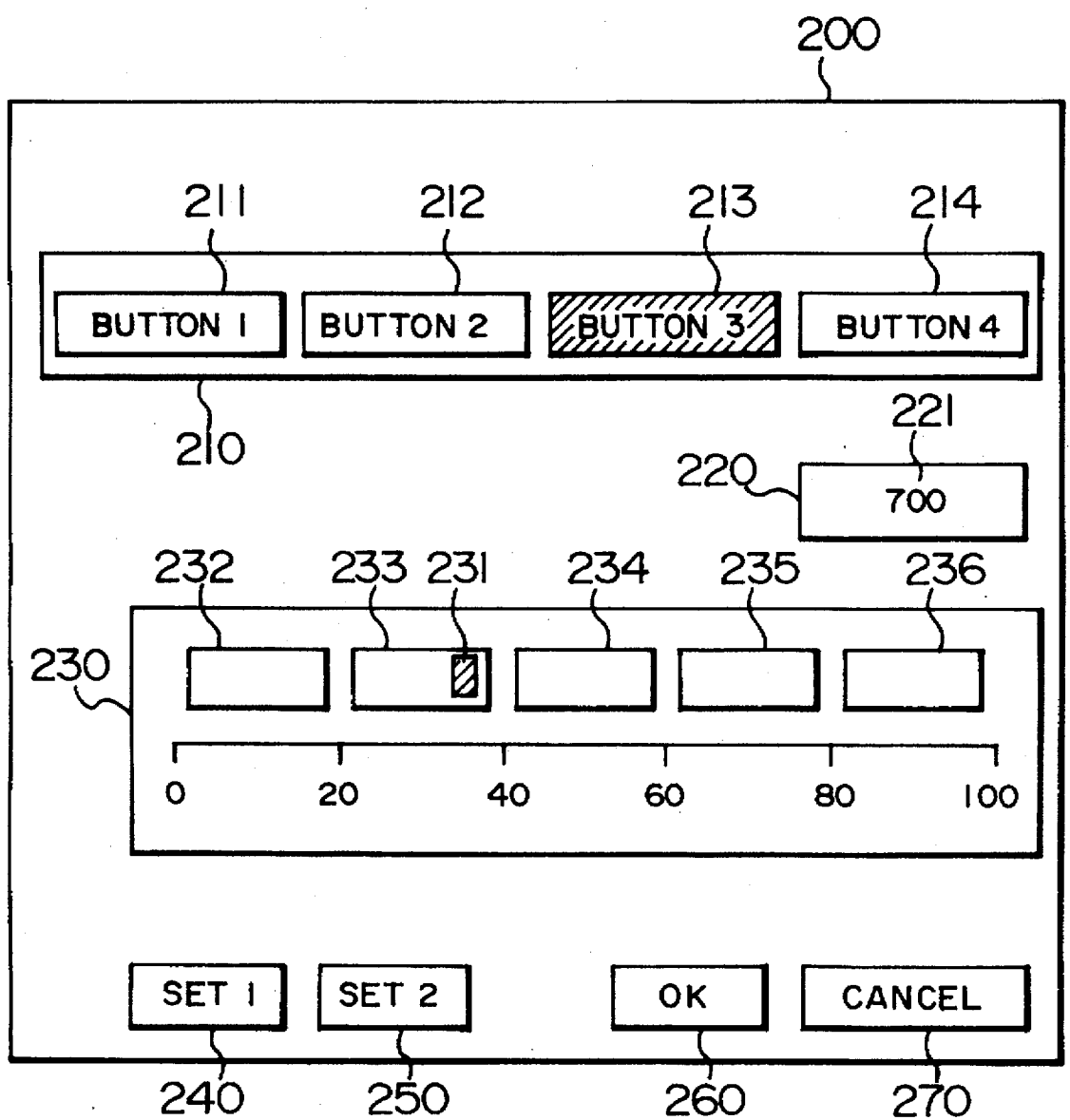
FIG. 2 is a diagram showing an example of a setting window to be opened when a function is activated according to the present invention.

FIG. 2 is a diagram showing an example of the setting window to be opened when a function is activated according to the present invention.

In FIG. 2, a numeral 200 indicates a setting window for the user to specify setting values in a screen which is opened by achieving a selection for the selective items 111 to 113 of functions presented on the display 110, a numeral 210 denotes setting value input buttons to achieve setting operations through selections of radio buttons 211 to 214 worked exclusively, a numeral 220 designates a setting value input field to designate a keyboard input value 221 supplied from the keyboard 150, a numeral 230 stands for a setting value input slider to carry out a setting operation through an operation in which a slide bar 231 operated by the mouse 120 is moved through a setting range 232 to 236, numerals 240 and 250 are new setting buttons generated to register values extracted according to the user adaptive system and the user adaptive method of the present invention, namely, combinations of setting values frequently used by the user, a numeral 260 indicates an OK button for the user to approve values of the setting value fields 210, 220, and 230, and a numeral 270 designates a CANCEL button for the user to cancel values of the setting value fields 210, 220, and 230.

According to the present invention, when the selection frequency matrix 300 corresponding to a combination of setting values is to be stored in the selection frequency matrix storage area 133, a setting operation is conducted by selecting one of the selective items which are like the radio buttons 211 to 214 worked exclusively. Namely, for the setting value input button 210, the radio buttons 211 to 214 selected exclusively are treated as a set such that a dimension of the selection frequency matrix 300 is assigned to each set so as to handle the values in an independent fashion. This consequently suppresses extraction of any impossible combination of setting values and hence there can be more correctly extracted a combination of setting values frequently used by the user.

In addition, in relation to the field 220 to set a keyboard input values 221 supplied from the keyboard 150, only when the inputted character string is numeric, the setting enabled values are subdivided according to an appropriate interval to assign selective items to each subdivided range such that selective items corresponding to the setting enabled values are assumed as a set, thereby assigning a dimension of the matrix 300 to each set of setting values.

With the provision, the continuous setting values are mapped onto discrete items so that the setting values having different characteristics are treated to be equivalent to the buttons 211 to 214, thereby easily extracting the setting values frequently used.

In addition, in relation to the slider 230 like an variable parameter which is continuously varied when the slide bar 231 is operated by the mouse 120, a setting enabled range associated with acceptable setting value is divided according to an appropriate interval. Each of the subdivided setting ranges 232 to 236 is regarded as a set so as to assign a dimension of the frequency matrix 300 to each set.

In this case, when the continuous setting values are mapped onto discrete selective items, the setting values having different characteristics can be treated to be equivalent to the buttons 211 to 214, which thereby facilitates extraction of the setting values frequently used.

Figure 3:
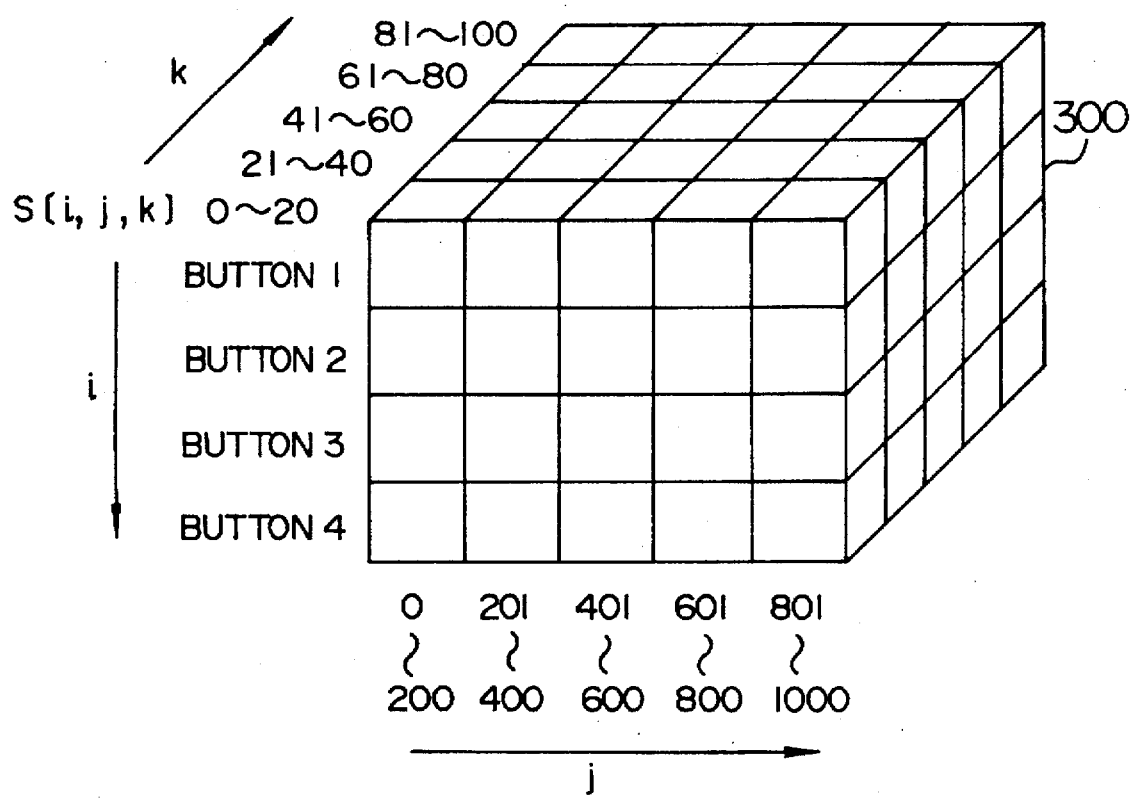
FIG. 3 is a diagram for explaining the selection frequency matrix to be updated in association with each combination of setting values set by user according to the present invention.

FIG. 3 is a diagram for explaining a selection frequency matrix to be updated in association with all combinations of the setting values set by user in accordance with the present invention.

In FIG. 3, a numeral 300 indicates a selection frequency matrix $S[i,j,k]$ related to the present invention to extract combinations of setting values to be frequently used by user. The setting values at the setting value input button 210, the setting value input field 220, and the setting value input slider 230 respectively correspond to the dimensions i, j, and k of the matrix 300. However, the number of dimensions of the matrix is not limited to three.

As above, employing the matrix $S[i,j,k]$, three kinds of setting values at button 210, field 220, and slider 230 having different characteristics are set in a unified manner. This consequently facilitates to extract combinations of setting values to be frequently used by the user.

Figure 4:
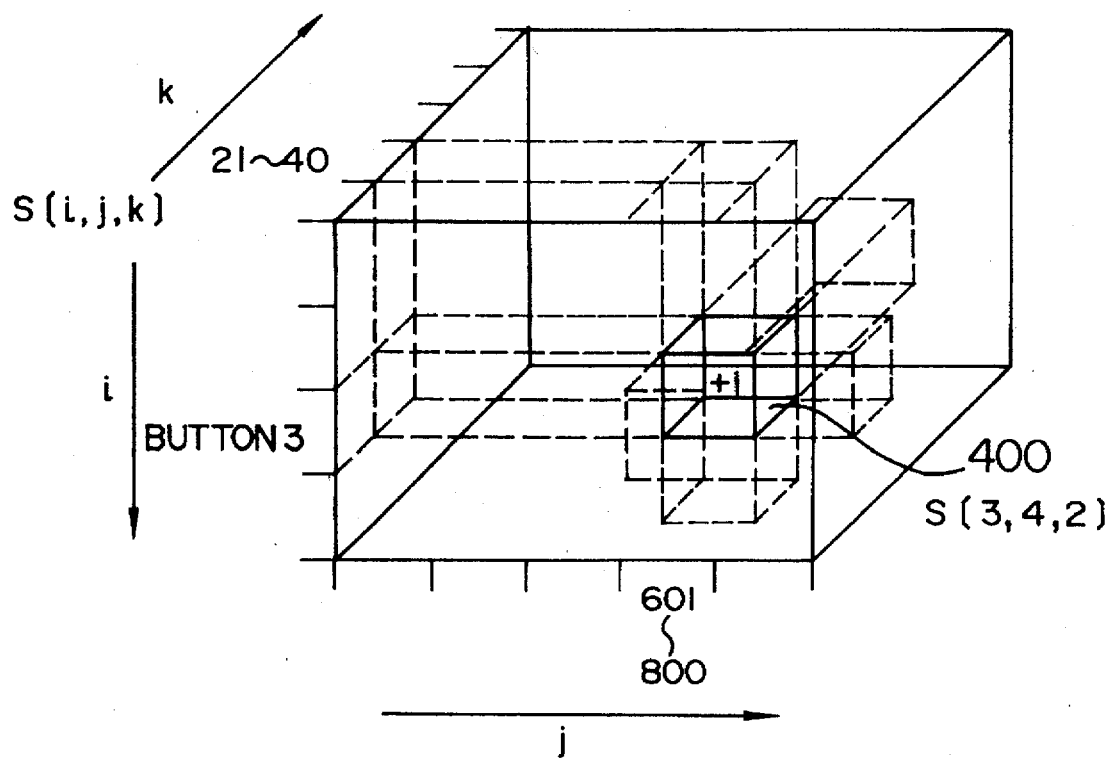
FIG. 4 is a diagram useful to explain a method of updating the selection frequency matrix according to the present invention.

FIG. 4 is a diagram useful to explain a method of updating a selection frequency matrix in accordance with the present invention.

In FIG. 4, a numeral 400 stands for a matrix element $S[3,4,2]$ to be updated in the matrix 300 according to the present invention.

In the setting window 200, when the radio button 213 is pushed at the setting value input button 210, the keyboard input value 221 is "700" at the setting value input field 220, and the slide bar 231 exists in the setting range 233 at the setting value input slider 230, the value of the matrix element $S[3,4,2]$ 400 corresponding to these three setting values is incremented by one.

The method of updating only the matrix element corresponding to the combination of setting values is effective when the user completely recognizes the relations of cause and effect for the setting values 210, 220, and 230 and it is possible to extract combinations of setting values to be frequently used.

Figure 5A:
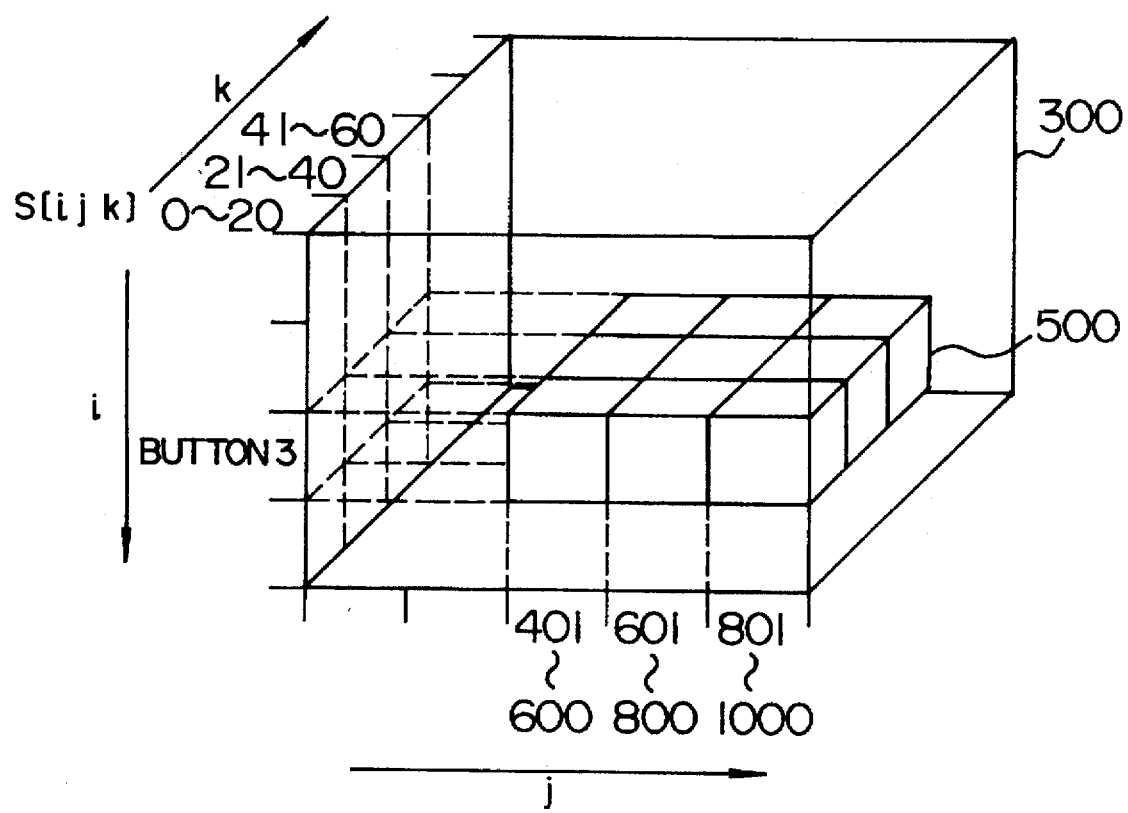
FIGS. 5A and 5B are diagrams for explaining another method of updating the selection frequency matrix according to the present invention.
Figure 5B:
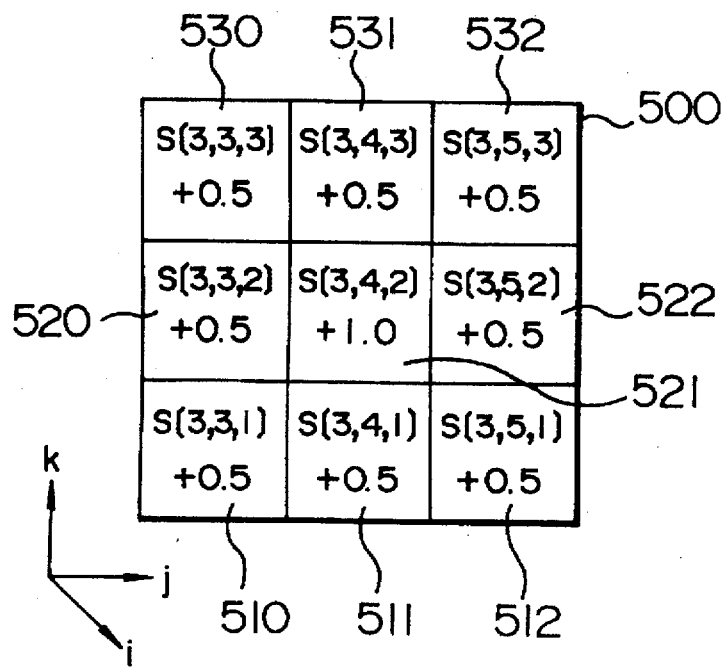

FIGS. 5A and 5B are diagrams for explaining another example of the method of updating a selection frequency matrix according to the present invention.

In FIG. 5A, a numeral 500 indicates a set of matrix elements of the selection frequency matrix 300 according to the present invention. In FIG. 5, numerals 510 to 512, 520 to 522, and 530 to 532 indicate matrix elements of the selection frequency matrix 300 of the present invention.

In the setting window 200, when the user pushes the radio button 213 at the setting value input button 210, sets the keyboard input value 221 to "700" at the setting value input field 220, and then moves the slide bar 231 into the setting range 233 at the setting value input slider 230, the value of the matrix element $S[3,4,2]$ 521 corresponding to each combination of the setting values related to the setting operation is incremented by one according to the user adaptive system and the user adaptive method of the present invention.

Moreover, centered on the matrix element S[3,4,2] 521, each of the values of matrix elements S[3,3,1] 510, S[3,4,1] 511, S[3,5,1] 512, S[3,3,1] 520, S[3,5,2] 522, S[3,3,3] 530, S[3,4,3] 531, and S[3,5,3] 532 is updated or incremented by a value which is reduced as the distance of the pertinent element relative to the element S[3,4,2] 521 is increased. Although the values of elements S[3,3,1] 510, S[3,4,1] 511, S[3,5,1] 512, S[3,3,1] 520, S[3,5,2] 522, S[3,3,3] 530, S[3,4,3] 531, and S[3,5,3] 532 are updated in this embodiment, it is naturally to be appreciated that the present invention is not restricted by this embodiment.

In a case where there exists many setting values, the user does not always understand the cause-and-effect relationship between all the values, even if he understood a part of their relationship. In consequence, there may exist items not selected in consideration of the relations between the setting values, and such items may possibly vary for each setting operation. According to the method of updating only one matrix element corresponding to the combination of setting values, consideration has not been given to such a setting value which is not specified in consideration of the relations between the setting values. Consequently, it is difficult to extract a combination of setting values reflecting the user's preference.

In contrast thereto, according to the method of updating the values of some matrix elements corresponding to a combination of setting values, the values are updated in a distributive manner. Consequently, it is possible to update the values also for a combination of setting values specified according to the intention or purpose of the user. Moreover, for the respective setting values, the system achieves the updating operation of the element values of the matrix 300 centered on an element thereof as above. Namely, the increment is minimized as the distance of the pertinent matrix element relative to the centered element is increased. This consequently includes the characteristic of the method of updating only one matrix element corresponding to the combination of setting values. In consequence, it is possible to extract a combination of setting values more satisfactorily reflecting the user's preference.

Figure 6:
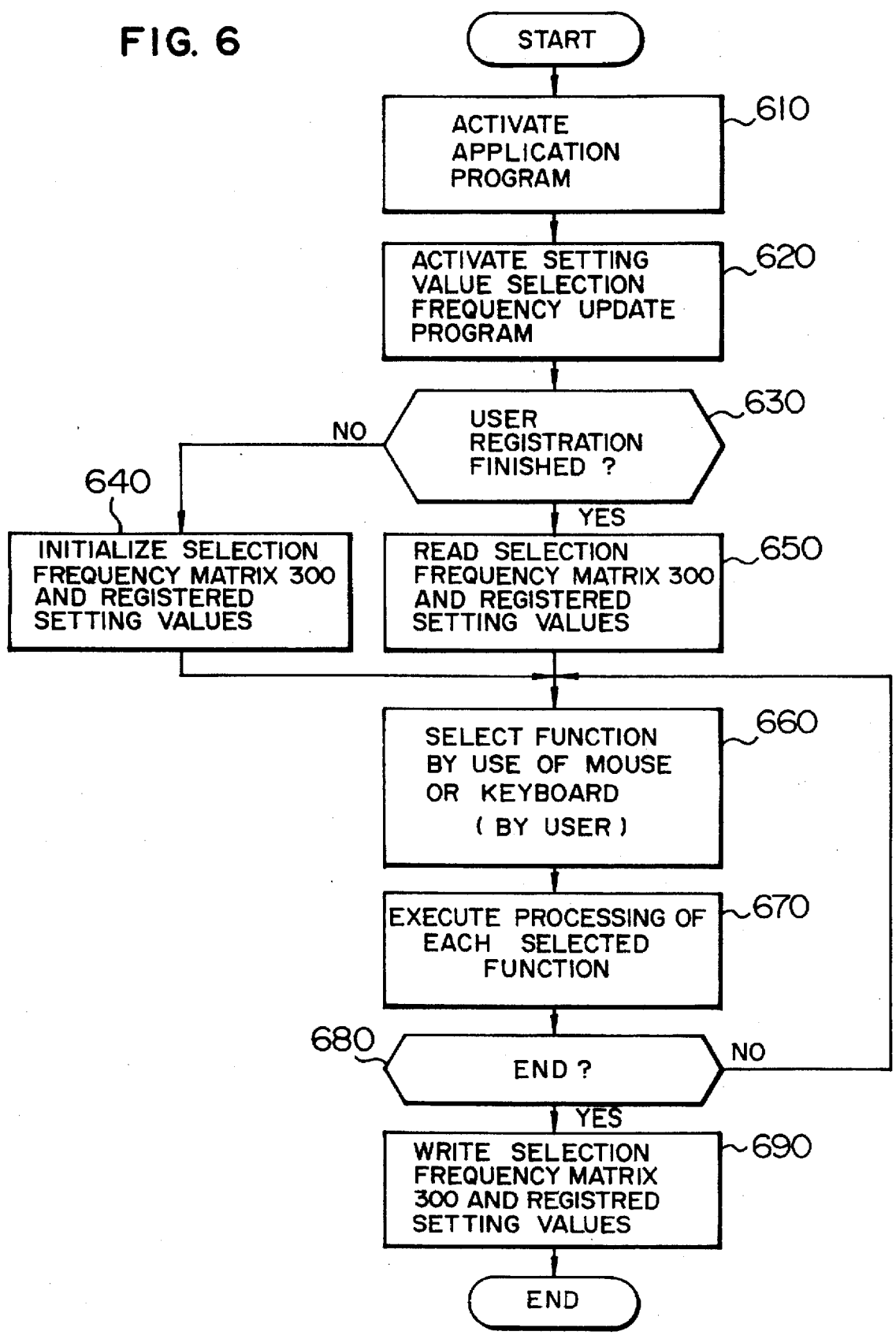
FIG. 6 is a flowchart of a processing procedure showing an embodiment according to the present invention.

FIG. 6 is a flowchart of a processing procedure in an embodiment according to the present invention.

First, when the user activates the user adaptive system and the user adaptive method of the present invention, there is initiated an application program loaded from the application program storage area 141 into the application program storage area 131 (step 610). Subsequently, the setting value selection frequency update program related to the present invention is loaded from the storage area 142 into the storage area 132 to be invoked (step 620), thereby judging to decide whether or not the user has been registered to the system in advance (step 630). If this is not the case, the matrix stored in the storage area 133 and the registered setting values stored in the registered setting value storage area are initialized (step 640).

If the user has been beforehand registered, the matrix 300 is moved from the storage area 143 to the storage area 133. Furthermore, at the same time, the registered setting values are read in the storage area 134 from the storage area 144 (step 650).

When the user selects one of the selective items 111 to 113 of functions presented on the display 110 by the mouse 120 or from the keyboard 150 (step 660), there is executed processing of each activated function (step 670). In this connection, the step 670 will be described in detail later by reference to FIG. 7. When the user inputs termination for the application program (step 680), the matrix 300 existing in the storage area 133 is written in the storage area 143. Moreover, simultaneously, the registered setting values are moved from the storage area 134 to the storage area 144 (step 690). In a case where the user does not input termination for the application program, the operation is repeatedly achieved beginning from the step 660.

Figure 7:
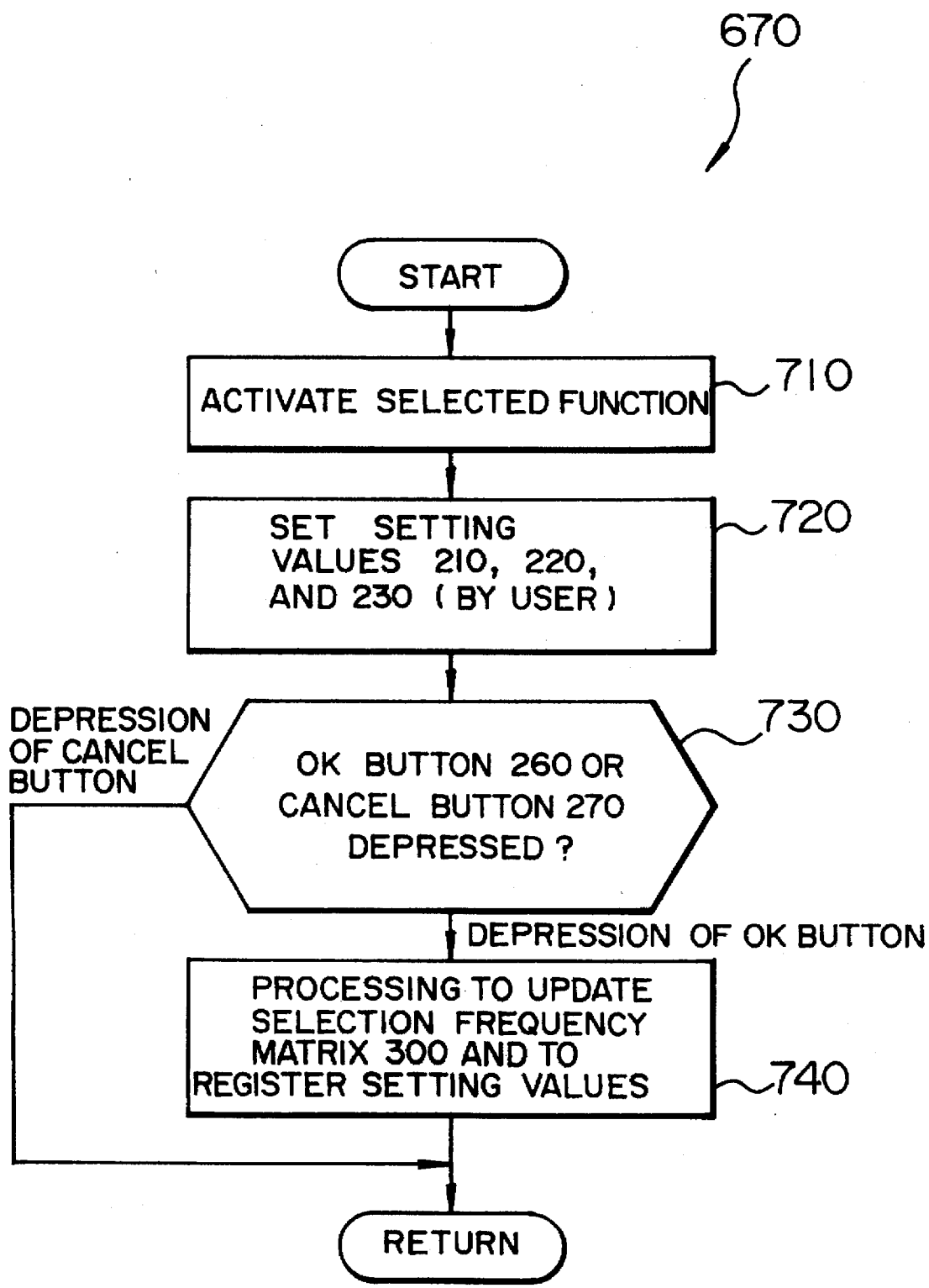
FIG. 7 is a flowchart related to processing of a activated function in the processing procedure according to the present invention.

FIG. 7 is a flowchart related to processing of the activated function in the processing procedure according to the present invention.

When the step 670 is invoked, the application program loaded in the storage area 131 initiates the function activated by the user in the step 660 (step 710) and then the setting window 200 is presented on the display 110. In the window 200 on the display 110, the user specifies by the mouse 120 or from the keyboard 150 the setting values at the button 210, the field 220, and the slider 230 (step 720).

The user then pushes the OK button 260 or the CANCEL button 270 to finish the setting operation (step 730). The application program then closes the window 200. When the OK button is pushed in the step 730, the setting value selection frequency update program associated with the present invention updates the matrix 300 and conducts a registration processing of the setting values (step 740). In this connection, the step 740 will be described later in detail by reference to FIG. 8.

When the Cancel button 270 is pushed in the step 730, the step 670 is terminated.

Figure 8:
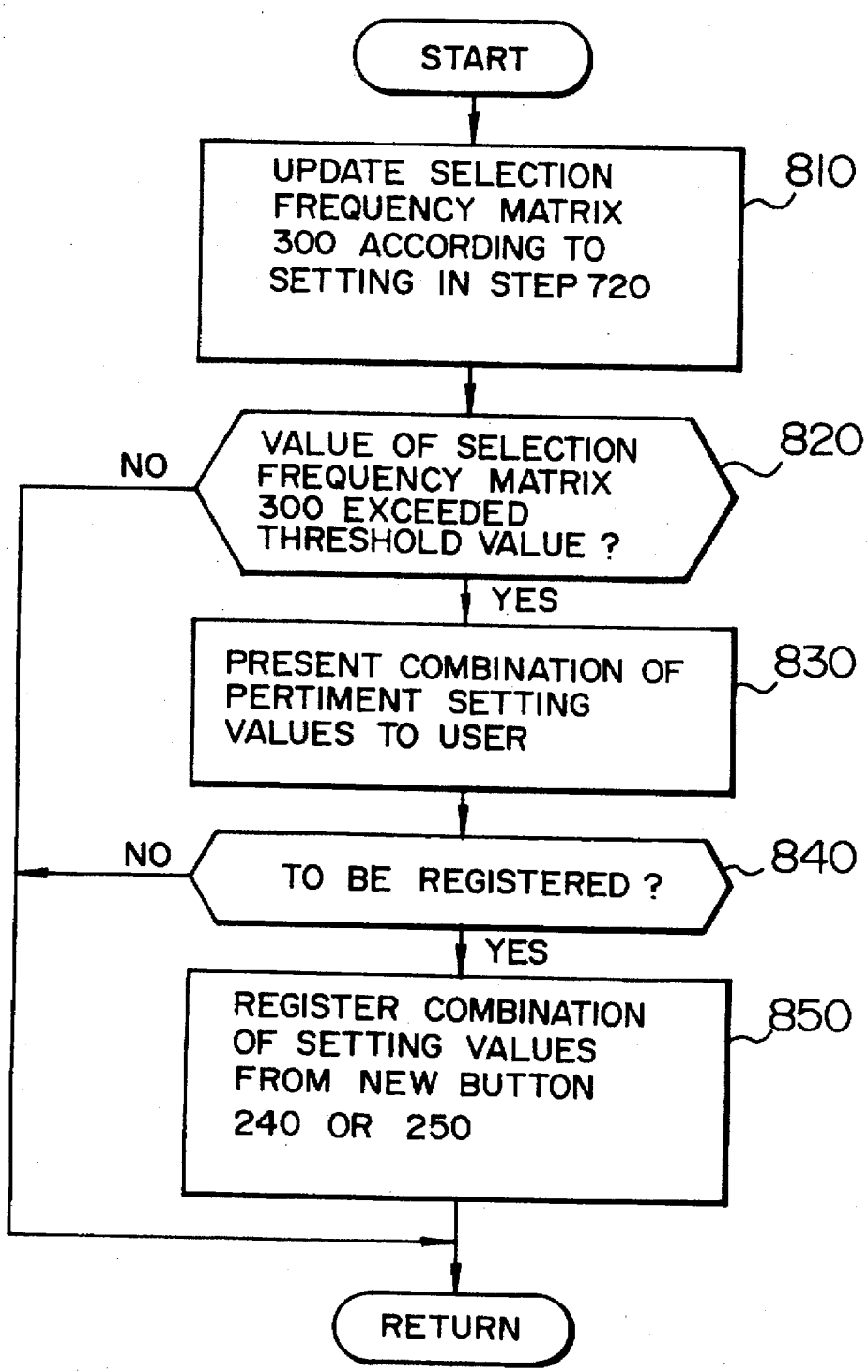
FIG. 8 is a flowchart related to the update of the selection frequency matrix and the registration of setting values in the processing procedure according to the present invention.

FIG. 8 is a flowchart related to the processing to update the selection frequency matrix and to achieve registration of the setting values in the processing procedure of the present invention.

When the step 740 is activated, the setting value selection frequency update program related to the present invention updates, according to the values of the setting values input button 210, the setting value input field 220, and the setting value input slider 230 specified in the step 720, the value of a position or values of some positions of the matrix 300 in association with the combination of setting values (step 810).

The system thereafter carries out a check to determine whether or not any updated value of the matrix 300 exceeds a preset threshold value (step 820). If this is the case, the combination of setting values associated with the values of the matrix exceeding the threshold value is presented to the user (step 830). Moreover, simultaneously, whether or not the presented combination of setting values is to be registered to the system is visually notified to the user (step 840). When the user responds thereto to register the combination, a correspondence between the new setting button 240 or 250 and the combination of setting values is registered to the registered setting values in the storage area 134 (step 850). When the user responds thereto not to register the combination of the setting values, the step 740 is finished.

Figure 9:
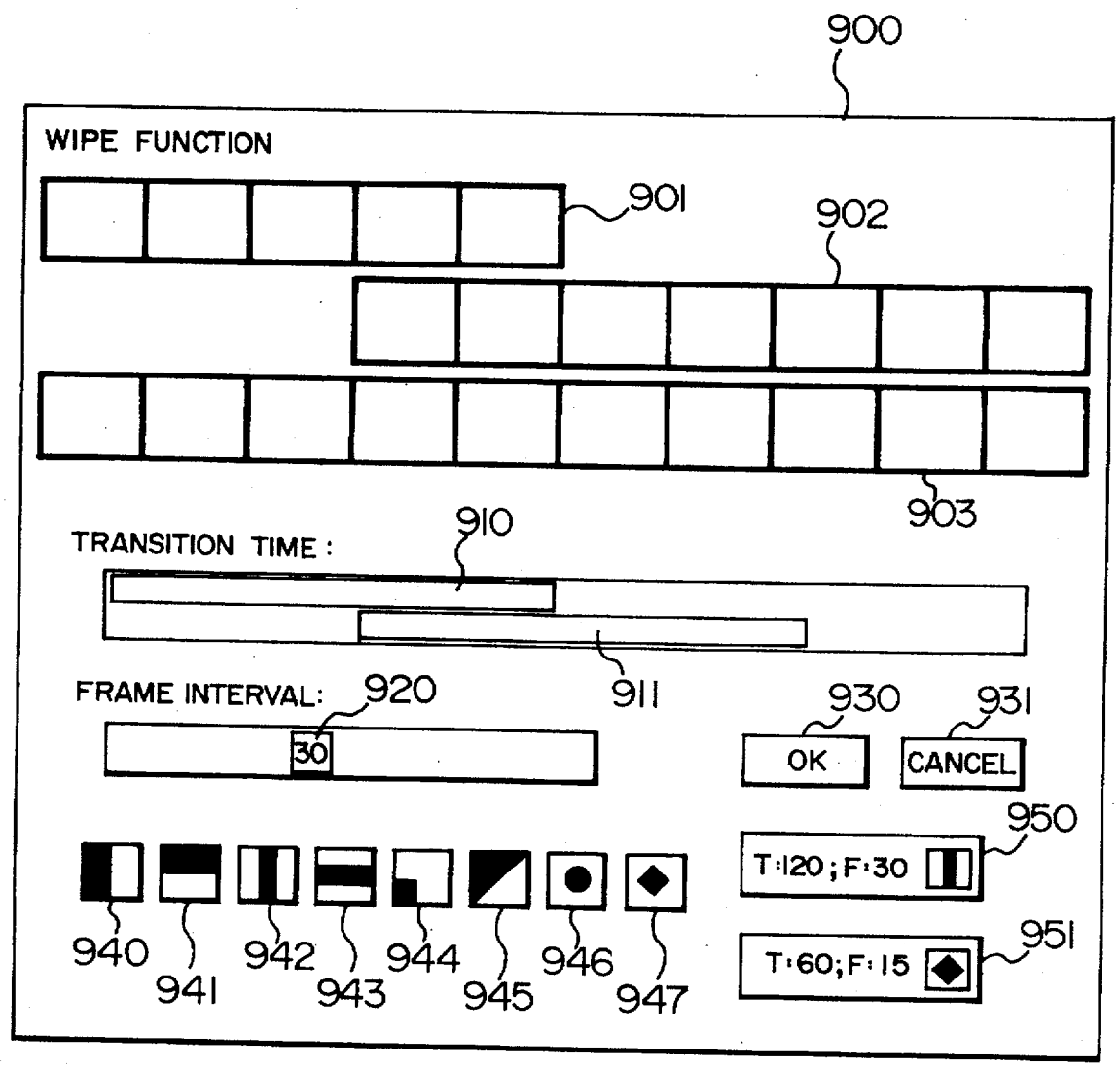
FIG. 9 is a diagram useful to explain implementation of the user adaptive system and the user adaptive method by the wipe function to edit a motion picture.

FIG. 9 is an explanatory diagram for implementing the user adaptive system and the user adaptive method by a function of editing a motion picture according to the present invention.

In FIG. 9, a numeral 900 denotes a wipe function window to achieve a wipe function in which the display presentation gradually transits from a scene to another scene in the motion picture editing operation, a numeral 901 indicates a motion picture display area to display a scene in which the wipe effect is achieved, a numeral 902 stands for a motion picture display area to display another scene in which the wipe effect is achieved, a numeral 903 designates a motion picture display area to display a scene undergone the wipe effect, numerals 910 and 911 indicate transition time setting slide bars to set a transition time for transition between two scenes, a numeral 920 denotes a frame interval setting slide bar to set a frame interval denoting the number of frames per minute in which a motion picture is displayed in the areas 901 to 903, a numeral 930 indicates an OK button to approve the transition time, the frame interval, and the wipe pattern specified, a numeral 931 stands for a CANCEL button to cancel a specified value, numerals 940 to 947 designate wipe patterns to set a pattern for transition from a scene to another scene, and numeral 950, 951 designate a new setting button generated so as to register thereto a combination of setting values which are frequently used by the user and which are extracted according to the user adaptive system and the user adaptive method of the present invention.

The transition time is set by operating the slide bar 911, whereas the value thereof is a multiple of the frame interval established by the slide bar 920. Consequently, there exists a correlation between the transition time and the frame interval. Furthermore, between the transition time and the wipe patterns 940 to 947, there considerably exist dependent relations according to the user's preference.

A combination of setting values frequently used by the user is extracted as above such that a value obtained by subdividing the value of transition time by that of frame interval, namely, the number of frames of the motion picture display areas 901 and 902 is assumed to be associated with a set of selective items, thereby assigning a dimension of the matrix 300 thereto. Moreover, the frame intervals and the wipe patterns are respectively regarded to form a set of frame intervals and a set of wipe patterns, and hence a dimension of the matrix 300 is assigned to each of the sets.

In the configuration, the value of each element of the matrix 300 is updated according to a combination of a transition time, a frame interval, and a wipe pattern set by the user. When the value exceeds a preset threshold value, there are created new setting buttons 950 and 951 capable of creating at a time the three pertinent setting values. This makes it unnecessary for the user to specify the many setting values in a step-by-step manner. Namely, it is only necessary for the user to push a button to set the values, which consequently relieves the user from the operational burden.

As described above, according to the present invention, in a function of an application program operating in a computer, there is stored a data structure corresponding to a combination of setting values specified by a user in a function of the application program. Each time a setting is conducted by the user, a data structure related thereto is updated. When a value of the data structure exceeds a threshold value, a pertinent combination of setting values is registered to the system. Consequently, a combination of setting values frequently employed by the user in a function can be automatically registered. As a result, operations setting in a step-by-step manner can be achieved only by pushing a button, thereby mitigating the load on the user.

Furthermore, when storing a data structure corresponding to a combination of setting values, in relation to values to be set by selecting from a group of selective items which are like radio buttons worked exclusively, items selected exclusively are treated as a set. A dimension of a matrix is assigned to each set of the items, and a group of setting values are treated in an independent manner. Consequently, there is suppressed extraction of an impossible combination of setting values and hence it is possible to more correctly extract a combination of setting values frequently used by the user.

Moreover, when storing the data structure corresponding to the combination of setting values, in relation to setting values like variable parameters to be successively modified by operating a slide bar with a mouse, a range of setting enabled values is subdivided according to an appropriate interval. Each subdivided range is assigned with selective items. A group of selective items corresponding to the setting enabled values are regarded as a set such that a dimension of a matrix is assigned to each set of the items, thereby mapping the continuous setting values onto discrete items. Consequently, the setting values having the different characteristics can be treated to be equivalent to the radio buttons and hence a combination of setting values frequently used by the user can be easily extracted.

In addition, when storing the data structure corresponding to the combination of setting values, in relation to values set by typed in numerical key, setting enabled values are subdivided according to an appropriate interval. Each subdivided range is assigned with selective items. A group of items corresponding to the setting enabled values are regarded as a set and a dimension of a matrix is assigned to each set of the items, thereby mapping the continuous setting values onto discrete items. Consequently, the setting values having the different characteristics can be treated to be equivalent to the radio buttons and it is facilitated to extract a combination of setting values frequently used by the user.

Moreover, when updating the matrix corresponding to the set of setting values, only a value of a position associated with the combination of setting values is updated. This makes it possible to easily extract a combination of setting values frequently used by the user.

Furthermore, in the operation to update the matrix corresponding to the set of setting values, some of values related to a setting are updated. Accordingly, it is facilitated to extract a combination of setting values frequently used by the user.

Additionally, a combination of the setting values frequently used is registered to a new button generated. Consequently, the user can set all of the values matching the user's preference only by depressing the button.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A user adaptive system for use in a computer system executing an application program, comprising:

setting means for arbitrarily setting values for a plurality of parameters of a job corresponding to a function being executed in the application program;

means for storing a data structure having an n dimensional matrix corresponding to a combination of values for said parameters arbitrarily set by a user utilizing said setting means;

means for updating said combination of values stored in said means for storing each time a user sets a value for a parameter utilizing said setting means; and means operative, when a particular combination of values for said parameters is used more than a predetermined number of times, for registering said particular combination of values for said parameters into said means for storing.

2. A user adaptive method for use in a computer system executing an application program, comprising the step of:

storing a data structure having an n dimensional matrix corresponding to a combination of values for a plurality of parameters arbitrarily set by a user for a job corresponding to a function being executed in the application program, said storing step comprises the steps of:

treating, in relation to values set by selecting items from a group of selective radio buttons, items selected exclusively as a set, and assigning a dimension of said n dimensional matrix to each of the items.

3. A method according to claim 2, wherein said storing step further comprises the steps of:

subdividing, in relation to values for variable parameters set by operating a slide bar with a mouse, a range of setting enabled values into subdivided ranges according to an appropriate interval;

assigning selective items to each of the subdivided ranges;

treating the selective items corresponding to the setting enabled values as a set; and assigning a dimension of a matrix for each set of the selective items.

4. A method according to claim 3, further comprising the step of:

updating said n dimensional matrix corresponding to the combination of values, wherein a value of only a position associated with the combination of values is updated.

5. A method according to claim 2, wherein said storing step further comprises the steps of:

subdividing, in relation to values set by keyboard, setting enabled values into subdivided ranges according to an appropriate interval only when an input character string is an integer;

assigning selective items to each of the subdivided ranges;

treating the selective items corresponding to the setting enabled values as a set; and assigning said n dimensional dimension of a matrix for each set of the selective items.

6. A method according to claim 5, further comprising the step of:

updating said n dimensional matrix corresponding to the combination of values, wherein a value of only a position associated with the combination of values is updated.

7. A method according to claim 2, further comprising the step of:

updating said n dimensional matrix corresponding to the combination of values, wherein a value of only a position associated with the combination of values is updated.

8. A method according to claim 2, comprising the step of:

updating said n dimensional matrix corresponding to the combination of values, wherein a value of only a position associated with the combination of values are updated.

9. A method according to claim 2, wherein the combination of values frequently used is registered to a button having been recently generated.

10. A method according to claim 2, wherein:

the function corresponding to the job is a a wipe function of a video processing; and the setting of values for said parameters includes at least one of setting of a transition time, a frame interval and a wipe pattern.

* * * * *